(12) United States Patent
Noldus et al.

(10) Patent No.: US 10,185,774 B2
(45) Date of Patent: *Jan. 22, 2019

(54) METHOD AND SYSTEM FOR EFFICIENTLY LOCATING IN A DATABASE A USER PROFILE IN AN IMS NETWORK

(71) Applicant: Telefonaktiebolaget LM Ericsson (publ), Stockholm (SE)

(72) Inventors: Rogier August Caspar Joseph Noldus, Goirle (NL); Jos Den Hartog, Capelle A/d Ijssel (NL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/592,324

(22) Filed: May 11, 2017

(65) Prior Publication Data

US 2017/0242928 A1    Aug. 24, 2017

Related U.S. Application Data

(63) Continuation of application No. 13/376,471, filed as application No. PCT/EP2009/057304 on Jun. 12, 2009, now Pat. No. 9,736,109.

(51) Int. Cl.
*G06F 7/00* (2006.01)
*G06F 17/30* (2006.01)
(Continued)

(52) U.S. Cl.
CPC .. *G06F 17/30867* (2013.01); *G06F 17/30952* (2013.01); *H04L 29/12188* (2013.01);
(Continued)

(58) Field of Classification Search
CPC ......... G06F 17/30867; G06F 17/30952; H04L 65/1073; H04L 65/1016
See application file for complete search history.

(56) References Cited

U.S. PATENT DOCUMENTS 6,219,458 B1 * 4/2001 Zandi ................... H04N 19/635
                                                   375/E7.044
6,219,548 B1 * 4/2001 Feltner .................... H04M 3/56
                                                   455/403
(Continued)

FOREIGN PATENT DOCUMENTS

EP          1517497 B1      3/2005
EP          1892918 A1      2/2008
(Continued)

*Primary Examiner* — Hasanul Mobin
(74) *Attorney, Agent, or Firm* — Coats & Bennett, PLLC

(57) ABSTRACT

Method and system for processing a request associated with a user from a requesting node to an answering node in a telecommunications network. A repository is associated with the answering node, the repository including a data structure including a plurality of user profiles associated with a plurality of users. In the answering node a user profile of the plurality of user profiles is associated with the user. The method comprising the steps of, assigning a unique user index to each user profile in the data structure, wherein the user index is representative of the location of the user profile within the data structure, communicating at least one user index to the requesting node, incorporating the user index in the request by the requesting node, transmitting the request from the requesting node to the answering node, and retrieving the user profile associated with the user associated with the request by the answering node on the basis of the user index.

14 Claims, 3 Drawing Sheets

(51) Int. Cl.
*H04L 29/12* (2006.01)
*H04W 8/04* (2009.01)
*H04L 29/06* (2006.01)
*H04L 29/08* (2006.01)

(52) U.S. Cl.
CPC ...... *H04L 61/1588* (2013.01); *H04L 65/1016* (2013.01); *H04L 65/1073* (2013.01); *H04L 67/306* (2013.01); *H04W 8/04* (2013.01); *H04L 29/12594* (2013.01); *H04L 61/3095* (2013.01)

(56) References Cited

U.S. PATENT DOCUMENTS

| | | | | |
|---|---|---|---|---|
| 6,769,000 | B1* | 7/2004 | Akhtar | H04L 29/06 |
| 7,984,169 | B2* | 7/2011 | Brunell | G06F 21/6254 709/229 |
| 2002/0065920 | A1* | 5/2002 | Siegel | G06Q 30/02 709/227 |
| 2002/0160810 | A1 | 10/2002 | Glitho et al. | |
| 2002/0165969 | A1 | 11/2002 | Gallant | |
| 2003/0104813 | A1* | 6/2003 | Julka | H04W 36/12 455/436 |
| 2003/0232629 | A1* | 12/2003 | Jang | H04M 3/4281 455/552.1 |
| 2004/0122895 | A1 | 6/2004 | Gourraud | |
| 2004/0203888 | A1* | 10/2004 | Mikan | H04L 51/04 455/456.1 |
| 2004/0266457 | A1* | 12/2004 | Dupray | G01S 5/0268 455/456.5 |
| 2006/0046712 | A1* | 3/2006 | Shamp | G06Q 30/0207 455/426.1 |
| 2006/0052113 | A1* | 3/2006 | Ophir | H04W 8/02 455/456.1 |
| 2007/0280462 | A1* | 12/2007 | Neece | H04M 3/5116 379/201.01 |
| 2008/0200153 | A1* | 8/2008 | Fitzpatrick | G06F 17/30867 455/414.1 |
| 2008/0261592 | A1* | 10/2008 | Finizole E Silva | H04L 29/12094 455/435.1 |
| 2009/0083809 | A1* | 3/2009 | Hayashi | H04N 5/783 725/88 |
| 2009/0172160 | A1* | 7/2009 | Klein | G06F 17/30867 709/225 |
| 2010/0185763 | A1 | 7/2010 | Britsch | |
| 2011/0071880 | A1* | 3/2011 | Spector | H04W 4/90 340/573.1 |

FOREIGN PATENT DOCUMENTS

| | | |
|---|---|---|
| EP | 2028811 A1 | 2/2009 |
| JP | 2003271809 A | 9/2003 |
| JP | 2006302217 A | 11/2006 |

\* cited by examiner

METHOD AND SYSTEM FOR EFFICIENTLY LOCATING IN A DATABASE A USER PROFILE IN AN IMS NETWORK

This application is a continuation application of U.S. patent application Ser. No. 13/376,471, filed 22 Dec. 2011, which is a national stage application of PCT/EP2009/057304, filed 12 Jun. 2009, the disclosures of all of which are herein incorporated by reference in their entirety.

TECHNICAL FIELD

The invention relates to a method of processing a request associated with a user from a requesting node to an answering node in a network.

BACKGROUND

Methods of processing a request associated with a user from a requesting node to an answering node in a network are known, and may require information relating to the user, e.g. stored in a user profile associated with the user, to be retrieved by the answering node, e.g. for determining how the request is to be treated. It is for instance possible that the information relating to the user determines how the request is treated, a service level of the request, an authorization level of the request, etc.

One such known method is used in an Internet Protocol (IP) Multimedia Subsystem (IMS) telecommunications network. Several entities in the IMS network may have to perform a database search, when processing for instance a session initiation protocol (SIP) session establishment request. Examples of such entities include a Proxy Call Session Control Function (P CSCF) entity, a Serving Call Session Control Function (S CSCF) entity and a Session Initiation Protocol Application Server (SIP-AS).

Examples where such entities need to perform a database search are:

(1) When an IMS user establishes a call (i.e. establishes a SIP session), the S-CSCF entity receives a SIP Invite from the P-CSCF or I-CSCF entity; the SIP Invite contains the P Asserted-Identity (PAI) header. The PAI header identifies the calling subscriber. The S-CSCF entity uses the PAI as criterion to search its internal database of registered subscribers, in order to obtain the user profile of this subscriber.

(2) When a call is established towards an IMS subscriber (i.e. a SIP session is established), the S-CSCF entity receives a SIP Invite from an I CSCF entity; the SIP Invite contains a Request Uniform Resource Identifier (R-URI). The R-URI identifies the called subscriber. The S-CSCF entity uses the R-URI as criterion to search its internal database of registered subscribers, in order to obtain the user profile of this subscriber.

(3) When a call is established towards an IMS subscriber, then the P-CSCF entity serving that subscriber receives a SIP Invite from the S CSCF entity. The P-CSCF entity uses the Contact address, contained in the R-URI in the SIP Invite or the P Called User header, as criterion to search its internal database of registered subscribers, in order to obtain the user profile of this subscriber.

(4) When a SIP-AS processes a service invocation request, then the SIP Invite sent to this SIP-AS contains a PAI and/or R-URI. When the SIP Invite relates to an originating SIP session establishment, then the SIP-AS uses the PAI as criterion to search its internal database of provisioned and registered subscribers, in order to obtain the user profile of this subscriber. When the SIP Invite relates to a terminating SIP session establishment, then the SIP-AS uses the R-URI as criterion to search its internal database of provisioned and registered subscribers, in order to obtain the user profile of this subscriber.

When an IMS network (e.g. ims.provider.com) supports only public SIP-URI's, i.e. IMS Public User Identities (IMPU), belonging to its own domain (e.g. sip:user_1234@ims.provider.com), nodes in that network, such as P CSCF entity or S-CSCF entity, can use the user-part of these SIP URI's (e.g. user_1234) as search key to find information on that subscriber, i.e. find a match in its internal subscriber record.

When an IMS network also allows other public SIP-URIs (e.g. sip:jos.den.hartog@ericsson.com), the home subscriber server (HSS) (and S CSCF entity and P-CSCF entity) must use this complete string (i.e. user@domain) as search key for the subscriber.

One problem in the above examples, but also in other methods of processing a request associated with a user from a requesting node to an answering node in a network in general, is that searching a database, e.g. a database of registered subscribers, may take some time. If treating the request requires the retrieval of information from the database as described above, then this may cause delay in processing the request.

SUMMARY

It is an object of the invention to, in an IMS network, provide a method for efficiently locating in a database a user profile associated with a user associated with a request.

Thereto according to the invention is provided a method of processing a request associated with a user from a requesting node to an answering node in a telecommunications network, wherein a repository is associated with the answering node, the repository including a data structure including a plurality of user profiles associated with a plurality of users, wherein in the answering node a user profile of the plurality of user profiles is associated with the user, the method including assigning a unique user index to each user profile in the data structure, wherein the user index is representative of the location of the user profile within the data structure, communicating at least one user index to the requesting node, incorporating the user index in the request by the requesting node, transmitting the request from the requesting node to the answering node, and retrieving the user profile associated with the user associated with the request by the answering node on the basis of the user index.

Preferably, the unique user index is assigned by the answering node. It is also possible that the unique user index is assigned by a central node.

This provides the advantage that the requesting node is given a user index, e.g. by the answering node, so that the answering node can tailor the user index to be easily processable by the answering node. Since the user index is representative of the location of the user profile within the data structure of the answering node, the answering node can immediately access the location within the data structure comprising the user profile. Hence, the answering node need not search where in the data structure the required user profile is stored.

Optionally, the user index is an integer value. The inventors realised that user-parts and domain-names can be long. Hence searching with the string "user@domain" as search key can be costly in terms of needed processing power.

Assigning the user index being an integer value, allows the user index to be a pointer to the location within the data structure of the user profile.

It will be appreciated that it is also possible, according to another aspect of the invention, that the user index is an integer value, although this integer value is not representative of the location within the data structure of the user profile. This will still provide the advantage that an integer search can be performed faster than a string search.

Optionally, the network is a Voice Over Internet Protocol (VOIP) network, more preferably an Internet Protocol (IP) Multimedia Subsystem (IMS) telecommunications network. The request may be an initial Session Initiation Protocol (SIP) request, such as a Session Initiation Protocol (SIP) invite.

Thus, according to an aspect of the invention is provided a method of processing an initial Session Initiation Protocol (SIP) request associated with a user from a requesting node to an answering node in an Internet Protocol (IP) Multimedia Subsystem (IMS) telecommunications network, wherein a repository is associated with the answering node, the repository including a data structure including a plurality of user profiles associated with a plurality of users, wherein in the answering node a user profile of the plurality of user profiles is associated with the user, the method comprising the steps of assigning, by the answering node, a unique user index to each user profile in the data structure, wherein the user index is representative of the location of the user profile within the data structure, communicating at least one user index to the requesting node, incorporating the user index in the initial Session Initiation Protocol (SIP) request by the requesting node, transmitting the initial Session Initiation Protocol (SIP) request from the requesting node to the answering node, and retrieving the user profile associated with the user associated with the request by the answering node on the basis of the user index.

It is possible that the answering node is a Proxy Call Session Control Function (P-CSCF) entity, a Serving Call Session Control Function (S CSCF) entity a Session Initiation Protocol Application Server (SIP-AS), or a Home Subscriber Server (HSS). The P-CSCF entity, the S-CSCF entity, the SIP-AS or the HSS may comprise the repository.

Optionally, incorporating the user index in the request by the requesting node comprises adding the user index, e.g. as a parameter, in an existing data element in the protocol used for sending the request, or incorporating the user index in an existing data element in the request message, such as a user part of a Universal Resource Identifier (URI). The user index may e.g. be added as a parameter in a SIP Route header in an initial Invite request message, whereby the Route header contains the Service-route received by the requesting node from the answering node, for the case that the requesting node is a SIP User Agent and the answering node is a S CSCF. Adding the user index as a parameter, may provide the advantage that if the answering node is not arranged to function according to the invention, the answering node may ignore the parameter. Hence, it is possible to implement the method of the invention in any node in the network, since an answering node functioning according to the invention is compatible with a requesting node not functioning according to the invention and vice versa. Thus, no large-scale upgrade of many nodes in a network is required for implementation of the invention in an existing network.

Optionally, the step of communicating the at least one user index to the requesting node is performed during a registration as a user of the network by the user associated with said user index.

Optionally, the method comprises verifying, by the answering node, when receiving a request containing a user index whether or not the user profile stored within the data structure of the answering node at the location referred to by the user index is indeed associated with the user issuing the request. Hence, the answering node may perform a validity check on the received user index. If the answering node determines that the user index in the received request is not associated with the user issuing the request, the method may comprise having the answering node revert to a (known) user profile retrieval method. Optionally, the method comprises returning, by the answering node, an updated (e.g. new) user index to the requesting node, when the above-mentioned validity check renders a negative result.

The invention also relates to a network node for use in a telecommunications network for processing a request, associated with a user, from a requesting node. The node has a repository associated therewith. The repository comprises a data structure including a plurality of user profiles associated with a plurality of users, wherein in the node a user profile of the plurality of user profiles is associated with the user. A unique user index is assigned to each user profile in the data structure, wherein the user index is representative of the location of the user profile within the data structure. The node is arranged for communicating at least one user index outwardly of the node, e.g. to the requesting node. The node is further arranged for retrieving, when receiving the request, the user profile associated with the user associated with the request on the basis of the user index. It will be appreciated that such network node may function as answering node within the telecommunications network.

The invention also relates to a network node for use in a telecommunications network for transmitting a request, associated with a user, e.g. to an answering node. The node has a repository associated therewith. The repository comprises a data structure including a plurality of user profiles associated with a plurality of users, wherein in the node a user profile of the plurality of user profiles is associated with the user. The node is arranged for receiving, e.g. from the answering node a unique user index associated with at least one user profile of the plurality of user profiles in the data structure, and for storing the user index in the data structure. The node is arranged for incorporating the user index in the request prior to transmitting the request. It will be appreciated that such network node may function as requesting node within the telecommunications network.

The invention also relates to a telecommunications network system, e.g. a voice over internet protocol (VOIP) network, such as an internet protocol (IP) multimedia subsystem (IMS) telecommunications network, comprising such answering node and such requesting

BRIEF DESCRIPTION OF THE DRAWINGS

The invention will now be further elucidated by means of, non-limiting, examples referring to the drawing, in which.

DETAILED DESCRIPTION

Figure 1:
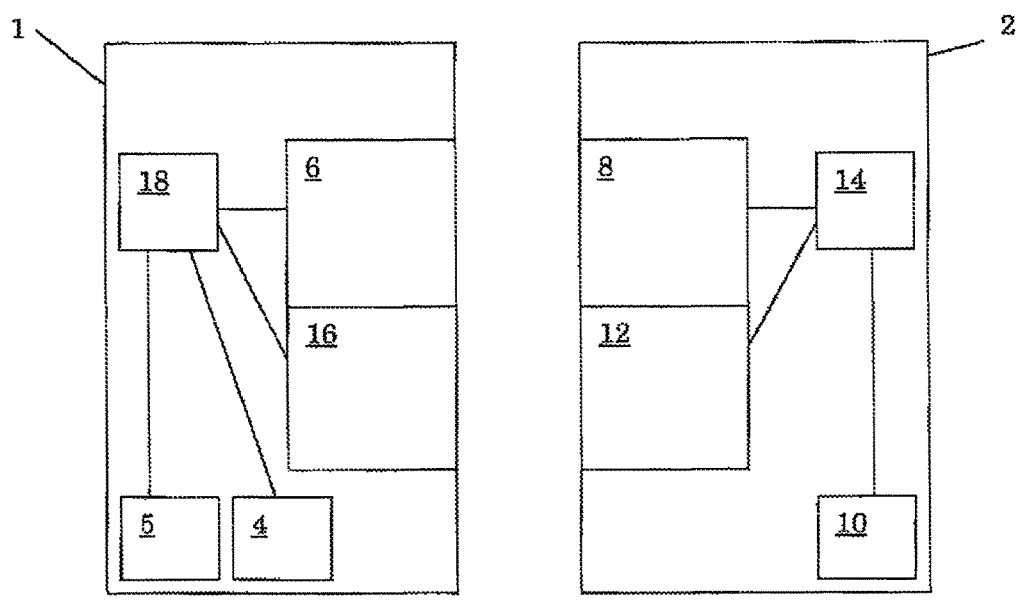
FIG. 1 shows a schematic representation of an example of a system according to the invention.
Figure 2:
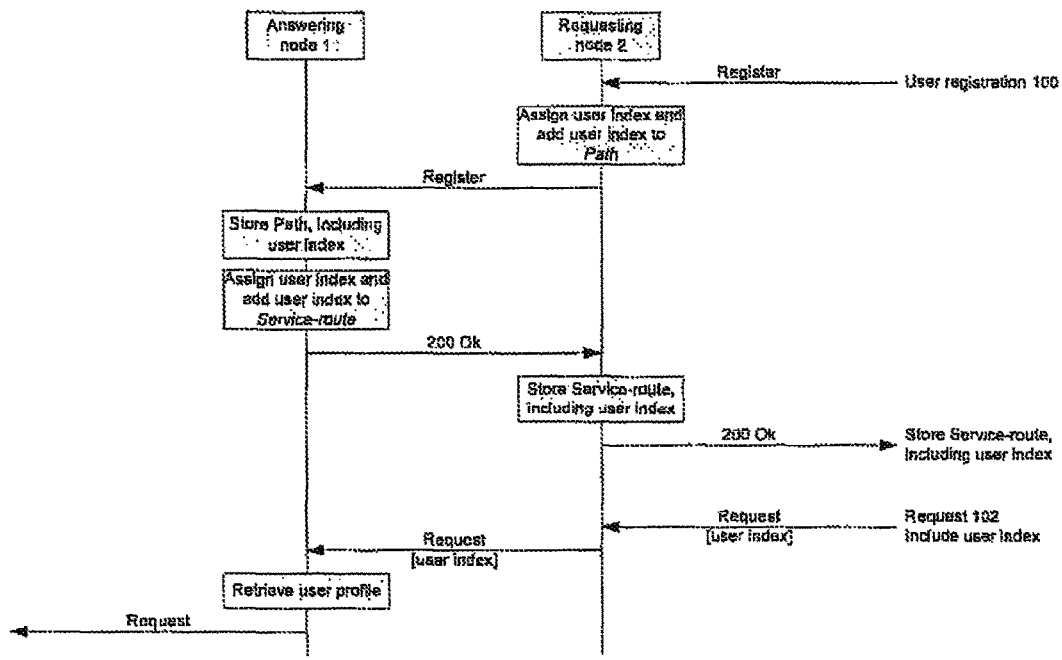
FIG. 2 shows a schematic representation of an example of a method according to the invention.

FIG. 1 shows a schematic representation of an example of a system according to the invention. FIG. 2 shows a schematic representation of an example of a method according to the invention. In FIG. 2 communication between an answering node 1 and a requesting node 2 is shown.

At some moment in time a user 100 registers with the answering node 1. The answering node may e.g. be a registrar entity as will be demonstrated below. The answering node stores a user profile associated with the user 100 in a data structure in a repository 4 and assigns, e.g. by means of index generation means 5, a user index to the user profile. In this example, the user index is representative of the location of the user profile within the data structure. The user index may for instance be an integer value representing a memory location of a start of the user profile within the data structure. The answering node 1, e.g. an output module 6 of the answering node 1, communicates the user index to the requesting node 2 which is communicatively connected to the answering mode. The requesting node 2 may receive the user index, e.g. using an input module 8, and store the user index in a repository 10 of the requesting node 2. Optionally, the requesting node 2 may pass the user index on to the user. The system is now ready to be used.

When the requesting node 2 receives a request relating to the user 100, the requesting node incorporates the user index associated with the user 100 in the request. Next, the requesting node 2 transmits the request to the answering node 1, e.g. using an output module 12. It will be appreciated that the requesting node 2 may comprise a processor 14 for controlling the input module 8, the repository 10, and the output module 12, and for processing messages and user indexes.

Upon receipt of the request, e.g. using an input module 16, the answering node 1 recognizes the user index in the request and may retrieve from the data structure the user profile associated with the user associated with the request on the basis of the user index. It will be appreciated that the time needed by the answering node 1 to retrieve the user profile may be decreased, since the user index is representative of the location of the user profile within the data structure. It will be appreciated that the answering node 1 may comprise a processor 18 for controlling the input module 16, the repository 4, and the output module 6 and for processing messages and user indexes.

Once the user profile has been retrieved, the answering node 1 may process the request, e.g. forward the request to a destination subscriber (e.g. called party or intended recipient of an Instant message).

In the above method it is for instance possible that the Serving Call Session Control Function (S-CSCF) entity, the Proxy Call Session Control Function (P-CSCF) entity, a Session Initiation Protocol Application Server (SIP-AS) or a Home Subscriber Server (HSS) acts as the answering node comprising a repository. It will be appreciated that for these cases the user index is a local user index for that S CSCF entity, P-CSCF entity, SIP-AS or HSS, respectively. The user index is representative of the location of the user profile within the data structure in the repository.

When such node-oriented user index is used, the issuer of the user index can make sure that the issued values correspond as good as possible to the used values in the data structure in the repository in the node. So, if the node uses records and record pointers to store data, the issued user indexes (e.g. integer values) can be used directly (e.g. as said pointers).

In another embodiment, the Home Subscriber Server may act as the answering node. In such case, the user index may be a local or a global user index.

When the subscriber is provisioned in the HSS, the HSS assigns a user index, e.g. an integer value, to the user. This integer value may be linked to the Public user identity of the user (IMPU) or to the subscriber record as a whole. In the latter case, the user index may relate to multiple IMPU's, if the subscriber has multiple IMPU's.

An HSS will normally use an array or list structure to store the provisioned subscribers in internal repository. Each entry in this array or list will have an (e.g. integer) identifier. This identifier may be used as user index for the present invention. If multiple HSS's are used, then each HSS can add a HSS-identifier to the user index, e.g. add a unique decimal digit to the integer value, to ensure uniqueness for all user indexes used for the subscribers in this IMS network. It will be appreciated that uniqueness among a plurality of HSS's is not strictly necessary, since if multiple HSS's are deployed, then Subscriber Location Function (SLF) is used to direct a Diameter message to the correct HSS.

The user index issued by the HSS can also be used as a central user index that is also used by other, decentral nodes when acting as answering node. When such central user index is used, it is possible that the value range (for the HSS user indexes) as used by the central node (HSS) is much larger than the amount of records in a decentral node that must use these indexes when acting as answering node. So, either the decentral node can assign more records (and pointers) to accommodate this range as issued by the HSS, or the decentral node can use some internal table to map the indexes as issued by the HSS to indexes (e.g. pointers) as used by the decentral node itself.

It will be appreciated that if the decentral node assigns more records (and pointers) to accommodate the range as issued by the HSS, the HSS user index is, both for the HSS and the decentral node, representative of a location of the user profile in the repository of the HSS and the decentral node, respectively.

It will be appreciated that if the decentral node uses some internal table to map the HSS user indexes as issued by the HSS to indexes (e.g. pointers) as used by the decentral node itself only for the HSS the HSS user index is representative of a location of the user profile in the repository of the HSS.

The above methods and systems will be elaborated in the following examples.

Example 1: S-CSCF Oriented User-Index for Originating SIP Session

When an Internet Protocol (IP) Multimedia Subsystem (IMS) subscriber registers with a Serving Call Session Control Function (S CSCF) entity as answering node, the S-CSCF entity provides the subscriber with a Service-route. The Service-route is stored by a User Agent (UA) as requesting node and is used by the User Agent when establishing a Session Initiation Protocol (SIP) session. The UA uses the received Service-route to fill a Route header in a SIP Invite (or other SIP request). In this manner, the SIP Invite will be routed via the S-CSCF entity where this subscriber is registered. The Service-route has the form of a Session Initiation Protocol Uniform Resource Identifier (SIP URI), containing the host name of the S CSCF and optionally a user part.

The SIP URI in the Service-route related to the S-CSCF may e.g. be as follows:

Service-Route: <sip:orig@s-cscf1.ims.provider.com;lr>

The Service-route may contain parameter(s). The 'lr' parameter is one example, as shown above, indicating loose routing.

According to an aspect of the invention, the S-CSCF entity includes a user index as parameter in the Service-route. In this example, the user index parameter points to the position in data structure in a repository in the S CSCF entity which position contains the required user profile. Example:

Service-Route: <sip:orig@s-cscf1.ims.provider.com;lr;user-index=12457> or

Service-Route: <sip:orig_user12457@s-cscf1.ims.provider.com;lr>

The parameter user-index=12457 means that this subscriber's user profile is located at position 12457 in the S-CSCF entity internal data structure for containing user profiles. In the second example, the S-CSCF has included the user index in the user part of the S-CSCF address. This has the further advantage that the requesting node need not take any additional action for storing and, later on, using a separate address parameter (user index=12457).

A user may, in accordance with prior art, when establishing a call, copy the Service-route into a Route header in the SIP Invite. This Route header will also contain the parameters of the Service-route. So, this Route header will include the user-index. The S-CSCF entity can, in this way, relate the incoming SIP Invite immediately to position 12457 in its internal data structure for containing user profiles.

Nevertheless, the S-CSCF entity may still verify that position 12457 in its internal data structure contains indeed the subscriber's user profile. If this would not be the case, the S-CSCF entity ignores the user index and reverts to a regular method for finding the user profile.

Example 2: S-CSCF Oriented User-Index for Terminating SIP Session

When an Internet Protocol (IP) Multimedia Subsystem (IMS) subscriber registers with the S-CSCF entity, the S-CSCF entity as answering node provides its address to the Home Subscriber Server (HSS), so the HSS can steer subsequently incoming SIP session to this S-CSCF entity. The S-CSCF entity may provide its address in a designated parameter in a Diameter Server Assignment Request (SAR). When the HSS later receives a Diameter Location Information Request (LIR) from an Interrogating Call Session Control Function (I CSCF) entity, it returns the stored S-CSCF entity address to the I-CSCF entity, in a Diameter Location Information Answer (LIA). A designated parameter in the LIA may be used to return the S-CSCF entity name (i.e. the address in the form of a SIP URI) to the I-CSCF entity.

When S-CSCF entity provides its address to the HSS (in a Diameter SAR), it adds a user-index parameter to the SIP URI containing its address. So, instead of proving the following address to the HSS for this registered subscriber:

Server name=sip:s-cscf1.ims.provider.com;lr the S-CSCF entity provides the following address to the HSS for this registered subscriber:

Server name=sip:s-cscf1.ims.provider.com;lr;user-index=12457.

Herein the user index is comprised in the parameter "user-index". It is also possible that the S CSCF provides the following address to the HSS for this registered subscriber:

Server name=sip:user_12457@s-cscf1.ims.provider.com;lr

Herein the user index is comprised in the user part of the user address. It is also possible that the S CSCF provides the following address to the HSS for this registered subscriber:

Server name=sip:user_12457_orig@s-cscf1.ims.provider.com;lr

Herein the user index is comprised in the user part of the user address. In this example the S CSCF adds "orig" in the user part, to distinguish between an originating address and a terminating address for this registered subscriber.

When the HSS sends a Diameter LIA to the I-CSCF entity, in response to a Diameter LIR, it provides the S-CSCF entity address, including the user index, e.g. the user-index=12457 parameter, to the I-CSCF entity. The I-CSCF entity uses the S-CSCF entity address as received from the HSS, including any parameters or the user index in the user part, to set the Route header in the SIP Invite that the I-CSCF entity will forward to the S-CSCF entity. The S-CSCF entity can, in this way, relate the incoming SIP Invite immediately to position 12457 in its internal data structure for containing user profiles. The S-CSCF entity may still verify that position 12457 in its internal data structure contains indeed the subscriber's user profile.

Example 3: S-CSCF Oriented User-Index for Server-Initiated SIP Session

An originating SIP session establishment may be run via the I CSCF entity as requesting node, for the purpose of having the I-CSCF entity obtain the S-CSCF entity address from the HSS. Such situation may occur when the session is established by a SIP application server not knowing the S CSCF entity address for this subscriber. The I-CSCF entity receives in this case an 'orig' parameter in the SIP URI in the Route header used to route the SIP Invite via this I-CSCF entity to the S-CSCF entity as answering node. The I-CSCF entity contacts the HSS and the HSS provides the stored S-CSCF entity address to the I-CSCF entity. This stored S-CSCF entity address is the S-CSCF entity address provided by the S-CSCF to the HSS during the time of registration.

The S-CSCF entity address provided to the HSS by the S-CSCF entity during registration is extended with a parameter containing a user-profile index related to the S-CSCF entity. Hence, the I-CSCF entity receives this S-CSCF entity address, including parameter, and routes the SIP Invite to this S-CSCF entity. The user index parameter in the SIP Invite allows the S CSCF entity to immediately select the user profile for this subscriber. The S CSCF entity may still verify that the indicated position in its internal data structure contains indeed the subscriber's user profile.

It will be appreciated that the S-CSCF entity may provide two addresses to the HSS: one for terminating SIP session establishment through this S-CSCF entity, another one for originating SIP session establishment through this S-CSCF entity. The user index may be added to the address for the terminating SIP session, to the address for the originating SIP session or to both addresses.

Example 4: P-CSCF Oriented User-Index for Terminating SIP Session

When an Internet Protocol (IP) Multimedia Subsystem (IMS) subscriber registers in the S-CSCF entity, the SIP Register message traverses a P CSCF entity. The P-CSCF entity will include a Path header in the SIP Register. The S-CSCF entity stores the SIP URI contained in the Path header and uses it to set a Route header for terminating SIP session establishment to the IMS subscriber.

Along the line of the above-described S-CSCF oriented user index, the P-CSCF entity as answering node provides the following Path header to the S-CSCF entity:

Path: <sip:term@p-cscf1.ims.telia.se;lr;user-index=34679> or

Path: <sip:user_34679_term@p-cscf1.ims.telia.se;lr>

In the first exemplary Path user-index=34679 indicates that the P CSCF entity has stored the subscriber's user profile at position 34679 of its internal data structure for storing user profiles. In the second exemplary Path, the P-CSCF has included the user index in the user part of the S-CSCF address. When the P-CSCF entity receives a SIP Invite for a terminating session, it can relate the SIP Invite immediately to position 34679 in its internal data structure for containing user profiles. The P-CSCF entity may still verify that position 34679 in its internal data structure contains indeed the subscriber's user profile.

Example 5: HSS Oriented User-Index

When two HSS interrogations take place in a single SIP session establishment a HSS oriented user-index may be used. Herein the use of a HSS oriented user index is explained by means of a single example relating to registration.

When a subscriber registers in an IMS, the SIP Register request message traverses the I-CSCF. The I-CSCF entity queries the HSS (in a Diameter User Authorisation Request (UAR)) to obtain a S-CSCF entity address. Assuming that the subscriber is not registered at that moment, the HSS returns (in a Diameter User Authorisation Answer (UAA)) S-CSCF entity capabilities. The I-CSCF entity selects a S-CSCF entity, based on the returned capabilities, and forwards the SIP Register to this S-CSCF entity. The S-CSCF entity has to contact the HSS in order to perform authorization (in a Diameter Multimedia Authorization Request (MAR)) or to perform user assignment (in a Diameter Server Alignment Request (SAR)).

The HSS as answering node may include in a Diameter User Authorisation Answer (UAA) a user index. This user index may relate to the position in an internal data structure in a repository of the HSS for storing user profiles. The I-CSCF entity adds this user index as parameter to the SIP URI contained in the From header and/or the SIP URI contained in the To header in the SIP Register request message. The SIP URI in the From header and To header identify the subscriber. The S-CSCF entity as requesting node uses the SIP URI of this subscriber, including the user index parameter, in the Diameter MAR or Diameter SAR. The HSS can, in this way, relate the incoming Diameter MAR or Diameter SAR immediately to the position in its internal data structure for containing user profiles. The HSS may still verify that this position in its internal data structure contains indeed the subscriber's user profile.

This mechanism, as described for a subscriber registration, may also be used for an originating unregistered SIP session establishment and a terminating unregistered SIP session establishment. In those cases, there is also double HSS interrogation, with I-CSCF passing the user URI towards S CSCF.

Example 6: Central User Index

Figure 3:
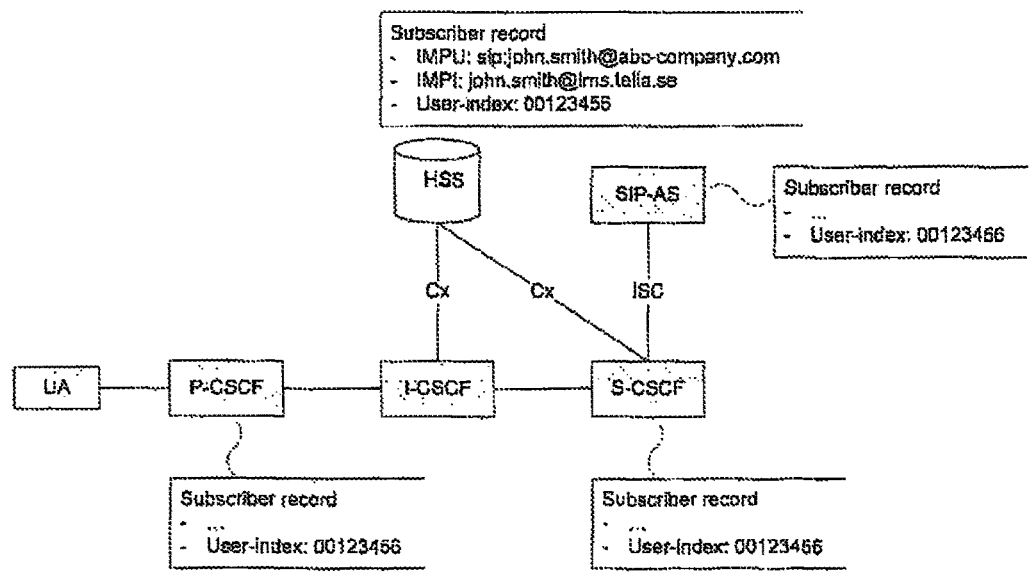
FIG. 3 shows a schematic representation of static subscriber data distribution, according to an embodiment of the invention.

FIG. 3 shows a schematic representation of static subscriber data distribution, in accordance with the invention. In the example of FIG. 3, the HSS has assigned 00123456 to the subscriber as User-index. In this example, the leading digits (00) identify the HSS; the trailing digits (123456) identify the user within the HSS. Hence this user index may be representative of the location of the user profile within the HSS. In this example, other nodes, such as the SIP-AS, P-CSCF entity or S-CSCF entity, also comprise the HSS user index in their subscriber records, stored in their own repositories.

Thus, when an IMS subscriber is provisioned in the IMS network, the HSS user index, in this example an integer value, is assigned to that user (during provisioning). This HSS user index is provided by the HSS and sent to the S CSCF entity, in one of the Diameter messages that are sent from the HSS to the S-CSCF entity during registration. The S-CSCF entity stores this HSS user index in its internal subscriber related data (user profile) and forwards the HSS user index to the P-CSCF entity (in the SIP 200 Ok). The P CSCF entity stores the HSS user index in its internal data record, together with the other user related data.

The S CSCF entity and/or P CSCSF entity may store the subscriber related data in its internal repository at a location, such that the HSS user index is also representative of the location of the subscriber data within the repository of the S CSCF entity and/or P CSCF entity, respectively. It is possible that, thereto, the S CSCF entity and/or P CSCF entity has to assign more records (and pointers) to accommodate the range as issued by the HSS. It is also possible that the S CSCF entity and/or P CSCF uses an internal table to map the HSS user index to a memory location (e.g. pointers), or even user index as used by the S CSCF entity and/or P CSCF entity itself.

If the S-CSCF entity sends a SIP Register to one or more Session Initiation Protocol Application Servers (SIP-AS's), as part of the 'third party registration' procedure, then the S-CSCF entity includes the HSS user index also in the SIP Register to these SIP-AS's. The SIP-AS stores the HSS user index in its internal, subscriber related data record (user profile).

Figure 4:
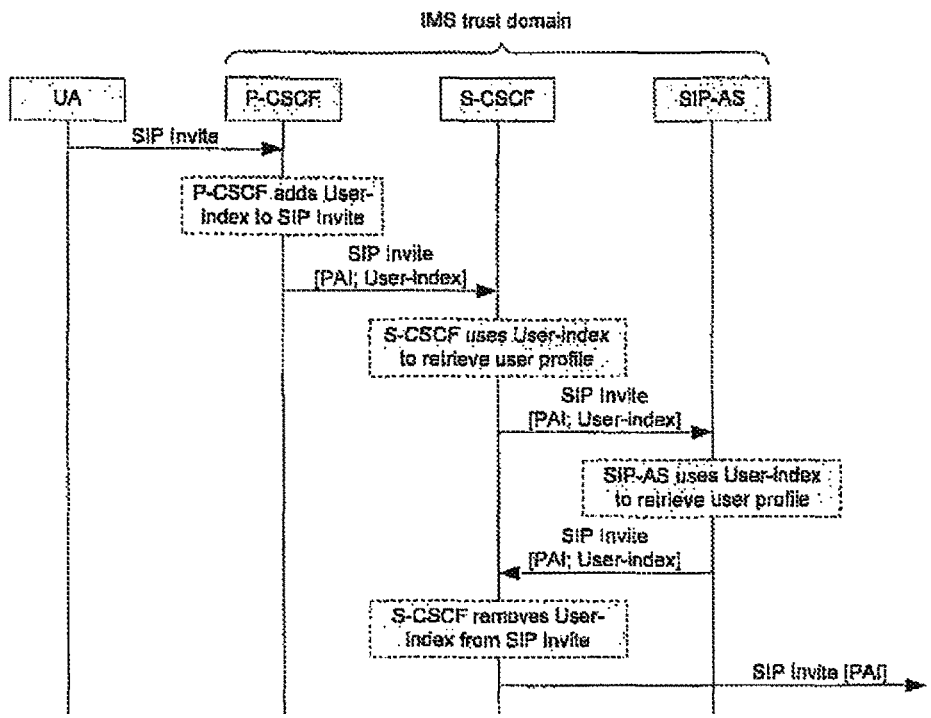
FIG. 4 shows a schematic representation of an originating call establishment according to an embodiment of the invention.

FIG. 4 shows originating call establishment in accordance with the invention. The adding of the HSS user index to the SIP Invite, as shown in FIG. 4, may be done by adding this HSS user index as parameter to the P asserted id header. When the S-CSCF entity has completed the processing of the SIP Invite, the HSS user index in the SIP Invite serves no further function and will therefore be removed from the SIP Invite by the S-CSCF entity.

When the subscriber establishes a call (SIP session), the P-CSCF entity applies regular (prior art) methodology to determine the identity of the calling subscriber. This may be by analyzing the From: header or by IP Sec relationship between the SIP UA and P-CSCF entity. The P-CSCF entity includes the aforementioned HSS user index in the SIP Invite that the P-CSCF entity forwards to the S-CSCF entity. The S-CSCF entity uses the HSS user index as search criterion to obtain the user profile from its repository. When the S-CSCF entity has obtained the user profile, based on the Integer value, it may still verify that the P-asserted-identity (PAI) received in the SIP Invite is contained in the user profile.

The S-CSCF entity may route the SIP Invite through one or more SIP-AS's. The S-CSCF entity retains the HSS user index in the SIP Invite sent to the SIP-AS's. The SIP AS uses the HSS user index as search criterion to obtain the user profile. When the SIP-AS has obtained the user profile, based on the HSS user index, it may still verify that the PAI received in the SIP Invite is contained in the user profile.

The use of the user index by the SIP-AS is optional. If the SIP-AS does not support this mechanism, then it ignores the user index and applies regular methodology to determine the calling subscriber, i.e. apply string matching between PAI and stored user records.

Figure 5:
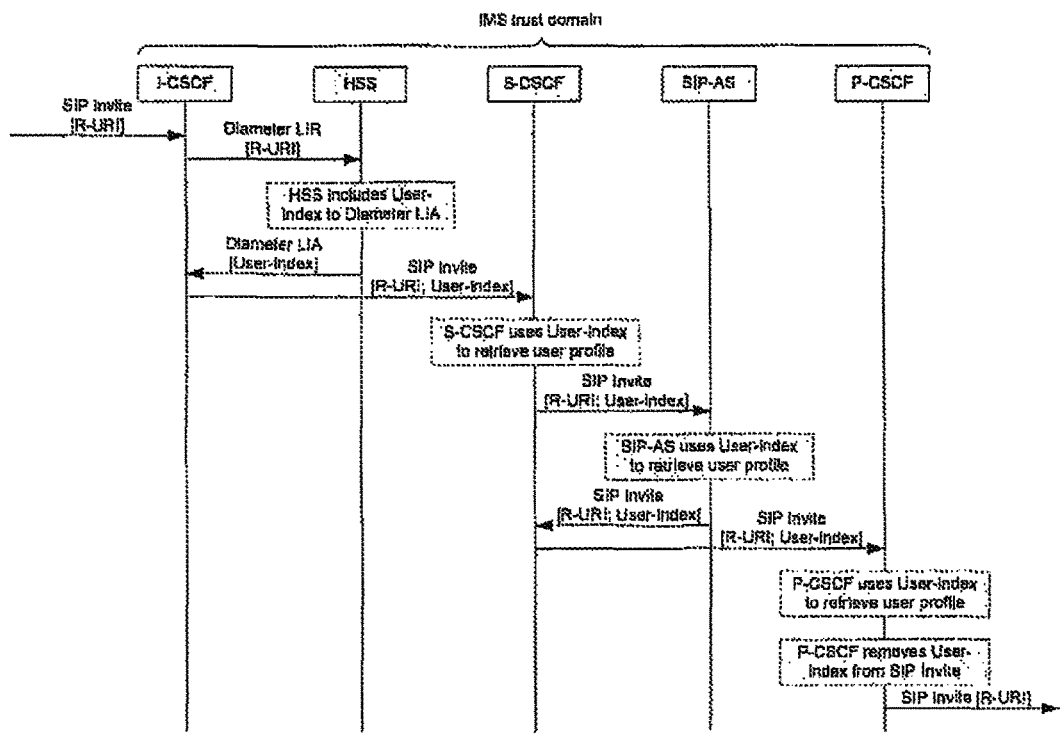
FIG. 5 shows a schematic representation of a terminating call establishment according to an embodiment of the invention.

FIG. 5 shows a terminating call establishment in accordance with the invention.

When the HSS adds the HSS user index to a Diameter Location Information Answer (LIA) message, this HSS user index may be contained in a parameter added to the S-CSCF entity address in the Server-Name data element. The Server-Name data element is a parameter contained in Diameter message.

When an I-CSCF entity in the IMS network receives a call (SIP session establishment request message) for a subscriber, it applies regular methodology to obtain the address of the S-CSCF entity to which the SIP Invite shall be forwarded, i.e. the I-CSCF entity contacts the HSS. The HSS includes the aforementioned HSS user index in the response to the I-CSCF entity. The I-CSCF entity then includes the HSS user index in the SIP Invite to the S-CSCF entity. The S-CSCF entity uses the HSS user index as search criterion to obtain the user profile in the repository of the S-CSCF entity. When the S-CSCF entity has obtained the user profile, based on the HSS user index, it may still verify that the R-URI received in the SIP Invite is contained in the user profile.

The S-CSCF entity may route the SIP Invite through one or more SIP-AS's. The S-CSCF entity retains the HSS user index in the SIP Invite sent to the SIP-AS's. The SIP AS uses the HSS user index as search criterion to obtain the user profile from the SIP-AS repository. When the SIP-AS has obtained the user profile, based on the HSS user index, it may still verify that the R-URI received in the SIP Invite is contained in the user profile.

The use of the integer by the SIP-AS is optional. If the SIP-AS does not support this mechanism, then it may ignore the HSS user index and applies regular methodology to determine the calling subscriber, i.e. apply string matching between R-URI and stored user records.

The S-CSCF entity will, when it has completed terminating call handling, forward the SIP Invite to the P-CSCF entity. The S-CSCF entity retains the HSS user index in the SIP Invite sent to the P-CSCF entity. The P CSCF entity uses the HSS user index as search criterion to obtain the user profile in the P-CSCF entity repository. When the P-CSCF entity has obtained the user profile, based on the HSS user index, it may still verify that the R URI received in the SIP Invite, containing the subscriber's contact address, matches with the contact address of the subscriber's user profile that was obtained with the HSS user index.

In the foregoing specification, the invention has been described with reference to specific examples of embodiments of the invention. It will, however, be evident that various modifications and changes may be made therein without departing from the broader spirit and scope of the invention as set forth in the appended claims.

It is possible that an IMS-subscriber has one or more private user identities (IMPI) and has one or more public user identities (IMPU). Multiple IMPU's can be combined into an "implicit registration set".

When a S-CSCF entity stores information (such as Initial Filter Criteria, IFC) for a subscriber, there may be a common understanding between HSS and S-CSCF entity on how this information is stored and/or accessed:

If the S-CSCF entity uses one record for each registered IMPU, the HSS could assign one HSS user index (e.g. integer value) per IMPU.

If the S-CSCF entity uses one record for each registered "registration set" (containing multiple IMPU's), the HSS could assign one HSS user index per set. When the HSS returns the HSS user index to the I CSCF entity, it could check to which set the requested REQ-URI belongs and return the integer value for that set.

In the examples, is referred to an Internet Protocol (IP) Multimedia Subsystem (IMS) telecommunications network. It will be appreciated that the invention may also be practised in other internet based communications networks, such as other voice over internet protocol networks.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A network node for use in a telecommunications network, the network node comprising:
   a repository including a data structure including a plurality of user profiles associated with a plurality of users; wherein in the network node a user profile of the plurality of user profiles is associated with a user; and
   a hardware processor configured to, during an initial registration of one of the plurality of users as a network user:
      assign a unique user index to a user profile in the data structure, wherein the unique user indexes is representative of a location within the data structure of the user profile associated with the user; and
      communicate the user index to a requesting node;
   wherein the hardware processor is further configured to, after completion of the initial registration:
      receive a request from the requesting node, the received request associated with at least one of a traffic session, a reregistration, and a deregistration, the received request including the user index for the user associated with the requesting node; and
      retrieve, in response to receiving the request, the user profile from the location in the data structure represented by the user index incorporated in the received request.

2. The network node according to claim 1, wherein the network node is further configured to verify, when receiving the request containing the user index, whether the user profile stored within the data structure of the network node at the location represented by the user index is associated with the user issuing the request.

3. The network node according to claim 2, wherein the network node is further configured to, if the network node determines that the user index in the received request is not associated with the user issuing the request, return an updated user index associated with the user issuing the request to the requesting node that sent the request.

4. The network node according to claim 1, wherein the user index comprises an integer value.

5. A network node for use in a telecommunications network, the network node comprising:
- a repository including a data structure including a plurality of user profiles associated with a plurality of users;
- wherein in the network node a user profile of the plurality of user profiles is associated with the user; and
- a hardware processor configured to, during an initial registration of the user with the network as a network user:
  - receive, from an answering node, a unique user index associated with a user profile of the plurality of user profiles in the data structure, and to store the received user index in the data structure;
- wherein the hardware processor is further configured to, after completion of the initial registration:
  - incorporate the stored user index for the user in a request, the request associated with at least one of a traffic session, a reregistration, and a deregistration; and
  - transmit the request to the answering node.

6. The network node according to claim 5, wherein the user index comprises an integer value.

7. A telecommunications network system comprising:
- an answering node comprising:
  - a first repository including a first data structure including a first plurality of user profiles associated with a first plurality of users;
  - wherein, in the answering node, a user profile of the first plurality of user profiles is associated with a user; and
  - a first hardware processor; and
- a requesting node comprising:
  - a second repository including a second data structure including a second plurality of user profiles associated with a second plurality of users;
  - wherein in the requesting node a user profile of the second plurality of user profiles is associated with the user; and
  - a second hardware processor;
- wherein during an initial registration of one of the plurality of users as a network user:
  - the first hardware processor is configured to:
    - assign a unique user index to the user profile in the first data structure, wherein the unique user index is representative of a location within the first data structure of the user profile associated with the user; and
    - communicate the user index from the answering node to the requesting node; and
  - the second hardware processor is configured to:
    - receive the user index associated with the user profile in the first data structure from the answering node; and
    - store the received user index in the second data structure; and
- wherein after completion of the initial registration:
  - the second hardware processor is further configured to:
    - incorporate the stored user index for the user in a request, the request associated with at least one of a traffic session, a reregistration, and a deregistration; and
    - transmit the request to the answering node; and
  - the first hardware processor is further configured to:
    - receive the transmitted request from the requesting node, the received request including the user index for the user associated with the requesting node; and
    - retrieve, in response to receiving the request, the user profile from the location in the first data structure represented by the user index incorporated in the received request.

8. The telecommunications network system according to claim 7, wherein the user index comprises an integer value.

9. The telecommunications network system according to claim 7, wherein the second hardware processor incorporates the user index associated with the user in the request by the requesting node by:
- adding the user index in an existing data element in the request; or
- incorporating the user index in an existing data element in the in a request message.

10. A method of processing a request associated with a user from a requesting node to an answering node in a telecommunications network; wherein a first repository is associated with the answering node, the first repository including a first data structure including a first plurality of user profiles associated with a first plurality of users; and wherein a user profile of the first plurality of user profiles is associated with the user; the method comprising:
- during an initial registration of one of the plurality of users as a network user:
  - assigning, at the answering node, a unique user index to the user profile in the first data structure, wherein the user index is representative of a location within the first data structure of the user profile associated with the user;
  - communicating the user index from the answering node to the requesting node;
  - receiving, at the requesting node, the user index from the answering node; and
  - storing the received user index associated with the user in the requesting node; and
- after completion of the initial registration:
  - incorporating, by the requesting node, the stored user index for the user in a request, the request associated with at least one of a traffic session, a registration, and a deregistration;
  - transmitting the request from the requesting node to the answering node;
  - receiving, by the answering node, the transmitted request from the requesting node, the received request including the user index for the user associated with the requesting node; and
  - retrieving, by the answering node and in response to receiving the request, the user profile from the location in the first data structure represented by the user index incorporated in the received request.

11. The method according to claim 10, wherein assigning the unique user index comprises assigning the unique user index by the answering node.

12. The method according to claim 10, wherein assigning the unique user index comprises assigning the unique user index by a central node.

13. The method according to claim 10, wherein the user index comprises an integer value.

14. The method according to claim 10, wherein incorporating, by the requesting node, the stored user index for the user in the request comprises:
- adding the user index in an existing data element in the request; or
- incorporating the user index in an existing data element in a request message.

* * * * *